US007882011B2

(12) United States Patent
Sandhu et al.

(10) Patent No.: US 7,882,011 B2
(45) Date of Patent: Feb. 1, 2011

(54) SYSTEMS AND METHODS OF CONDUCTING FINANCIAL TRANSACTIONS

(75) Inventors: Harpal S. Sandhu, Palo Alto, CA (US); Ian Doull, Chappaqua, NY (US); Brian Liedberg, East Stroudsburg, PA (US)

(73) Assignee: Integral Development Corp., Mountain View, CA (US)

( * ) Notice: Subject to any disclaimer, the term of this patent is extended or adjusted under 35 U.S.C. 154(b) by 0 days.

(21) Appl. No.: 10/911,076

(22) Filed: Aug. 3, 2004

(65) Prior Publication Data

US 2005/0075967 A1 Apr. 7, 2005

Related U.S. Application Data

(63) Continuation-in-part of application No. 09/703,198, filed on Oct. 31, 2000.

(51) Int. Cl.
*G06Q 40/00* (2006.01)
(52) U.S. Cl. .......................................... 705/37; 705/35
(58) Field of Classification Search .................. 705/37, 705/26
See application file for complete search history.

(56) References Cited

U.S. PATENT DOCUMENTS

| | | | |
|---|---|---|---|
| 4,677,552 A | 6/1987 | Sibley, Jr. | |
| 5,270,922 A | 12/1993 | Higgins | |
| 5,497,317 A | 3/1996 | Hawkins et al. ............... 705/37 |
| 5,508,913 A | 4/1996 | Yamamoto et al. | |
| 5,630,127 A | 5/1997 | Moore et al. ............ 707/103 R |
| 5,710,889 A | 1/1998 | Clark et al. .................. 235/379 |
| 5,742,932 A | 4/1998 | Levitsky | |
| 5,774,878 A | 6/1998 | Marshall | |
| 5,787,402 A | 7/1998 | Potter et al. | |
| 5,799,151 A | 8/1998 | Hoffer ......................... 709/204 |
| 5,884,274 A | 3/1999 | Walker et al. | |
| 5,905,974 A * | 5/1999 | Fraser et al. ............... 705/36 R |
| 5,913,202 A | 6/1999 | Motoyama ................. 705/36 R |
| 5,946,667 A | 8/1999 | Tull et al. | |
| 5,950,176 A | 9/1999 | Keiser et al. | |
| 5,963,923 A | 10/1999 | Garber ........................... 705/37 |
| 5,973,695 A | 10/1999 | Walsh et al. .................. 715/854 |
| 6,012,046 A * | 1/2000 | Lupien et al. .............. 705/36 R |

(Continued)

FOREIGN PATENT DOCUMENTS

AU 778101 3/2005

(Continued)

OTHER PUBLICATIONS

Massimb et al.; Electronic trading, market structure and liquidity Financial Analysts Journal v50n1 pp. 39-50 Jan.-Feb. 1994.*

(Continued)

*Primary Examiner*—Jagdish N Patel
(74) *Attorney, Agent, or Firm*—Kilpatrick Stockton LLP

(57) ABSTRACT

Systems and methods of conducting financial transactions are disclosed. One method disclosed comprises receiving prices from a plurality of providers, updating a database of providers based at least in part on the received prices, and arranging the prices in the updated database of providers by arranging bid rates in a first order, arranging offer rates in a second order, and resolving a tie.

2 Claims, 17 Drawing Sheets

U.S. PATENT DOCUMENTS

| | | | |
|---|---|---|---|
| 6,012,098 A | 1/2000 | Bayeh et al. | 709/246 |
| 6,029,146 A | 2/2000 | Hawkins et al. | 705/35 |
| 6,049,783 A | 4/2000 | Segal et al. | 705/37 |
| 6,085,203 A | 7/2000 | Ahlers et al. | 715/523 |
| 6,092,056 A | 7/2000 | Tull et al. | |
| 6,112,189 A * | 8/2000 | Rickard et al. | 705/36 R |
| 6,125,391 A | 9/2000 | Meltzer et al. | 709/223 |
| 6,144,990 A | 11/2000 | Brandt et al. | 709/203 |
| 6,167,448 A | 12/2000 | Hemphill et al. | 709/224 |
| 6,182,029 B1 | 1/2001 | Friedman | 704/9 |
| 6,195,647 B1 | 2/2001 | Martyn et al. | 705/36 R |
| 6,205,433 B1 | 3/2001 | Boesch et al. | 705/26 |
| 6,247,000 B1 | 6/2001 | Hawkins et al. | |
| 6,278,982 B1 | 8/2001 | Korhammer et al. | |
| 6,317,727 B1 | 11/2001 | May | |
| 6,347,307 B1 | 2/2002 | Sandhu et al. | 705/35 |
| 6,393,411 B1 | 5/2002 | Bishop et al. | |
| 6,415,270 B1 * | 7/2002 | Rackson et al. | 705/36 R |
| 6,850,907 B2 * | 2/2005 | Lutnick et al. | 705/37 |
| 6,892,184 B1 | 5/2005 | Komem et al. | |
| 7,206,768 B1 | 4/2007 | deGroeve et al. | |

FOREIGN PATENT DOCUMENTS

| | | |
|---|---|---|
| AU | 780518 | 7/2005 |
| JP | 10222581 | 8/1998 |
| WO | WO 02/52369 | 7/2002 |

OTHER PUBLICATIONS

Office Action mailed Dec. 11, 2008 for corresponding U.S. Appl. No. 10/105,084.

Office Action mailed Aug. 31, 2009 for corresponding U.S. Appl. No. 10/105,084.

Office Action mailed Sep. 11, 2007 for corresponding U.S. Appl. No. 09/703,198.

Bond Markets Go Electronic, Jun. 1, 1988.

Massimb, Marcel N.; Phelps, Bruce D., "Electronic Trading, Market Structure and Liquidity" Financial Analysts Journal, v50n1 pp. 39-50, Jan.-Feb. 1994.

Examination Report mailed Aug. 29, 2009 for corresponding Great Britain Application No. 701757.7.

Office Action mailed Aug. 23, 2007 for corresponding U.S. Appl. No. 10/105,084.

Office Action mailed Jun. 12, 2008 for corresponding U.S. Appl. No. 09/703,198.

Sandhu, Harpal S., "Beyond STP: The next generation of eFX integration," e-FOREX, Apr. 2006, p. 59.

Sandhu, Harpal S., "Heterogeneity in the FX Markets: "One size fits all" doesn't fit anymore," Viewpoint, e-FOREX, Jul. 2006, p. 48.

Pilot, Kevin, "Bond Markets Go Electronic," Jun. 1, 1998, found at http://www.registeredrep.com/mag/finance_bond_markets_go/index.html.

International Search Report and the Written Opinion for Application No. PCT/US04/25273, dated Apr. 6, 2006 (mailing date).

European Search Report for Application No. EP 00 97 8322, dated Apr. 26, 2008.

Glushko, Robert J., et al., "An XML Framework for Agent-Based E-Commerce," Communications of the ACM, vol. 42, No. 3, pp. 106-114, Mar. 1999.

International Preliminary Examination Report for Application No. PCT/US02/09106, dated Jun. 14, 2004 (mailing date).

International Search Report for Application No. PCT/US02/09106, dated Dec. 3, 2003 (mailing date).

FinXML.org web page located at http://www.finxml.com/default.asp, Last visited on Jun. 27, 2001, 1 p.

International Search Report for Application No. PCT/US00/30076, dated Apr. 20, 2001 (mailing date).

International Search Report for Application No. PCT/US00/16526, dated Nov. 27, 2000 (mailing date).

Java Servlet Technology (Product Description), Sun Microsystems Web Page, http://java.sun.com/products/servlet, printed Oct. 2, 2000.

JavaScript (Functional Description), Netscape Web page, http://home.netscape.com/eng/mozilla/3.0/handbook/javascript/getstart.htm, printed Oct. 2, 2000.

"At FTC Workshop Harpal Sandhu Says 'Neutrality' is Key to Competition in B2B Electronic Markets," Business Wire, Jul. 2000.

"Risk Portals Make Their Debut," Wall Street & Technology Online (Jun. 2, 2000), <www.wstonline.com/story/WST20000602S0015>.

Adriana Senior, "Web Sites Planned for Trade in Credit Derivatives, Forex," American Banker Online (Nov. 9, 1999), <www.integral.com/news_and_events/itn_991109.asp>.

Gus Hahn, "Derivatives Standards," Wall Street & Technology Online (Oct. 1, 1999), <www.westonline.com/story/WST20000609S0001>.

Bernhard Warner, "Big Brokerage Firms Inch Online," The Standard (May 7, 1999), <www.thestandard.com/article/display/0,1151,4519,00.html>.

Koch, Timothy W., "Banking and Finance Technology," Fourth Edition, Washington, D.C.: American Bankers Association, 1999.

Press Release, "CFOWeb.com Brings the Power of the Internet to Capital Markets," Sep. 1999.

Fields, Duane K., "Java Servlets for JavaScripters," Netscape Communications Corporation, pp. 1-10, Oct. 1998.

Perry Colley McKinney, "Internet Foreign Exchange Trading Draws Smaller Investors," The Detroit News (Sep. 26, 1998), <http://detnews.com/1998/technology/9809/26/09260095.html>.

John Greenwald, "A Nation of Stock Keepers," Time, vol. 151, No. 18 (May 11, 1998), <www.time.com/time/magazine/1998/dom/980511/business_.a_nation_of_st6.htm>.

"Currency Management Corporation: CMC Hits $20 Billion Traded Over Internet in Year," M2 Presswire, pp. 1-2, Feb. 16, 1998.

Goldfarb, Charles, et al., "XML Handbook," Prentice-Hall, Inc., pp. 89, 316-317, 527-529, 1998.

Press Release, Open Financial Exchange, "Intuit, Microsoft, and CheckFree Create Open Financial Exchange" [online], Jan. 16, 1997, Retrieved from the Internet: http://www.ofx.net/ofx/pressget.asp?id=5.

Higgins, Kieran, "Internet FX Trading Goes On-Line," Corporate Finance, pp. 1-2, Sep. 16, 1996.

"Pioneering Users Moving to Faster Methods of EDI," Network World, 1 p., May 6, 1991.

* cited by examiner

SYSTEMS AND METHODS OF CONDUCTING FINANCIAL TRANSACTIONS

CROSS REFERENCE TO RELATED APPLICATIONS AND CLAIM FOR PRIORITY

This application is a continuation-in-part of U.S. patent application Ser. No. 09/703,198 filed Oct. 31, 2000, titled "System and Method for Conducting Web-Based Financial Transactions in Capital Markets," which is incorporated in its entirety herein by reference. This application also incorporates in its entirety herein by reference each of: (i) U.S. Provisional Patent Application Ser. No. 60/139,113 filed Jun. 14, 1999, titled "System and Method for an XML Vocabulary for Capital Markets"; (ii) U.S. Provisional Patent Application Ser. No. 60/162,873 filed Nov. 1, 1999, titled "Method and Apparatus for Web-Based Management of Financial Risk and Pricing and Trading of Financial Products"; and (iii) U.S. patent application Ser. No. 09/593,324 filed Jun. 13, 2000, titled "System and Method for Conducting Web-Based Financial Transactions in Capital Markets," now U.S. Pat. No. 6,347,307. Each of the foregoing is assigned to the assignee of the present invention.

FIELD OF THE INVENTION

The present invention relates generally to financial transactions. More specifically, the present invention generally relates to systems and methods of facilitating the execution of financial transactions.

BACKGROUND

A number of financial transactions, such as payment of bills, on-line banking and trading in capital markets have been enhanced by, and may have been enabled over, computer networks. These networks generally have increased the speed of these transactions. The volumes exchanged in capital markets have experienced a significant rise over the past few years, based at least in part on such computer networks.

Known methods of financial trading over computer networks generally involve sending out requests for quotes, receiving responses to these requests, going through a few deal iterations and then entering into deals. Such methods may be cumbersome and time consuming, which may reduce the speed of transactions. The speed of transactions and data analysis generally are important in the capital markets, which are very dynamic. One's ability to react to changing market scenarios is an important factor related to profitable trading. Thus, it may be advantageous for one to be provided with as much relevant and timely information to make decisions in the dynamic capital markets.

A user involved in a particular transaction needs information about the market to enable the user to enter a deal effectively. Among the different trading information needed, the bids and offers made by providers in the market may be quite important. A provider may provide a bid/offer pair as a quote. A bid generally is a rate offered by a provider at which the provider wishes to buy a financial instrument. Generally, an offer is a rate at which a provider wishes to sell a financial instrument. Important information for a user may be the best bid, e.g., the highest bid, and the best offer, e.g., the lowest offer, made in the market. Another important parameter for a user may be an amount of financial instrument that may be available in the market for buying or selling at a particular bid rate or offer rate.

Known systems may provide users with such information in a consolidated form, and may facilitate such transactions. Examples of such known systems may include EBS Spot, Reuters 3000 Matching, Advanced Currency Market (ACM) interface and the Forex.com interface. Several of the features provided by these products are described below.

A provider generally may provide a bid/offer pair as a quote. Among the received quotes, the best quote may be displayed to the user. The best quote may be decided by such systems based on a difference between the bid and offer rates within the quote. When a user is interested in buying, however, it may not be interested in the bid rate within a quote. Thus, the interface may provide the separation of the bid rate from the offer rate. An individual bid rate or offer rate generally is called a price. The best prices may be displayed from among the bids and offers in the market. In addition, the information about previous transactions may be displayed. This may provide a short history of the market and the transactions made by the user. Further, the volume of currency available for a particular bid/offer pair also may be displayed.

PCT publication WO02052369A2, titled, "System and Method for a Universal Trading Plafform," assigned to Financial Markets Solutions, Inc. describes an online foreign exchange transaction manager, which separates best bid rates from best offer rates, and displays them to a user over a customized user interface. This publication, as well as the above-mentioned systems/interfaces, however, suffer from one or more limitations.

For example, the quotes displayed to a user may be quotes received from the providers with which the users may have a mutual credit agreement. In addition, if a user and a provider have given each other a credit line, each of them may only see the quotes applicable for the lesser of the two credits provided. Since the amount available from each provider may not be displayed, the depth of the market may be hidden from the users.

In another example of limitations of the known systems, the best bids and offers may be displayed to the user. A user, however, may be interested in prices, which may not be the best prices. A user might also be interested in knowing the total amount available in the market for buying or selling at different bid rates and offer rates, respectively. Additionally, a user may have preferred providers, and may be interested in monitoring the bids and offers made by these preferred providers. The existing systems, do not provide users with a means for choosing a preferred provider.

Although a user may be interested in the best bids and offers available in the market to decide upon a transaction, the user may also desire information about the depth of the market. Such information may enable a user to make an informed decision. Thus, there is a need for systems and methods that provide users with a more detailed listing of the bids and offers relevant to the user that are available in the market. There also is a need to provide details about the total amount available in the market corresponding to each of these bid and offer rates. Further, there is a need to aggregate the prices available in the market.

As speed is an important parameter in making decisions and executing transactions in the capital markets, there further is a need for a systems and methods that will reduce the time required for a user to obtain desired information to make an informed decision.

SUMMARY

Embodiments of the present invention comprise systems and methods of conducting financial transactions. In one exemplary embodiment, a method of conducting a financial transaction comprises receiving prices from a plurality of providers, updating a database of providers based at least in part on the received prices, and arranging the prices in the updated database of providers by arranging bid rates in a first order, arranging offer rates in a second order, and resolving a tie if at least two providers provide an equal price.

Another exemplary embodiment comprises a computer-readable medium on which is encoded program code, that, when executed, causes an application to carry out at least one such method.

The present invention may provide several advantages. For example, users may track market depth on a fairly or substantially continuous basis. Users may track many of all the bids and offers being made in the capital market. Users may be provided with a detailed list of many or all the bids and offers being provided in the market. A user may choose which transactions to enter. A user may choose which bids and offers to view.

The present invention also may make the terms of transaction provided by the user-preferred providers more visible by giving them a higher preference while building the lists of the terms of transaction provided by the providers.

Another advantage may be to allow a user to easily identify the total available transaction volume provided by the user's preferred providers at the same price.

Still another advantage may be to facilitate making a transaction with low user intervention.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments may be understood by examining this specification.

BRIEF DESCRIPTION OF THE DRAWINGS

The accompanying drawings, which constitute part of this specification, help to illustrate embodiments of the invention.

DETAILED DESCRIPTION

The present invention provides methods and systems for facilitating the execution of financial transactions. Financial transactions may be of various types such as spot market transactions, forward market transactions and futures market transactions. The present invention may use streamed financial information for various financial transactions.

Figure 1:
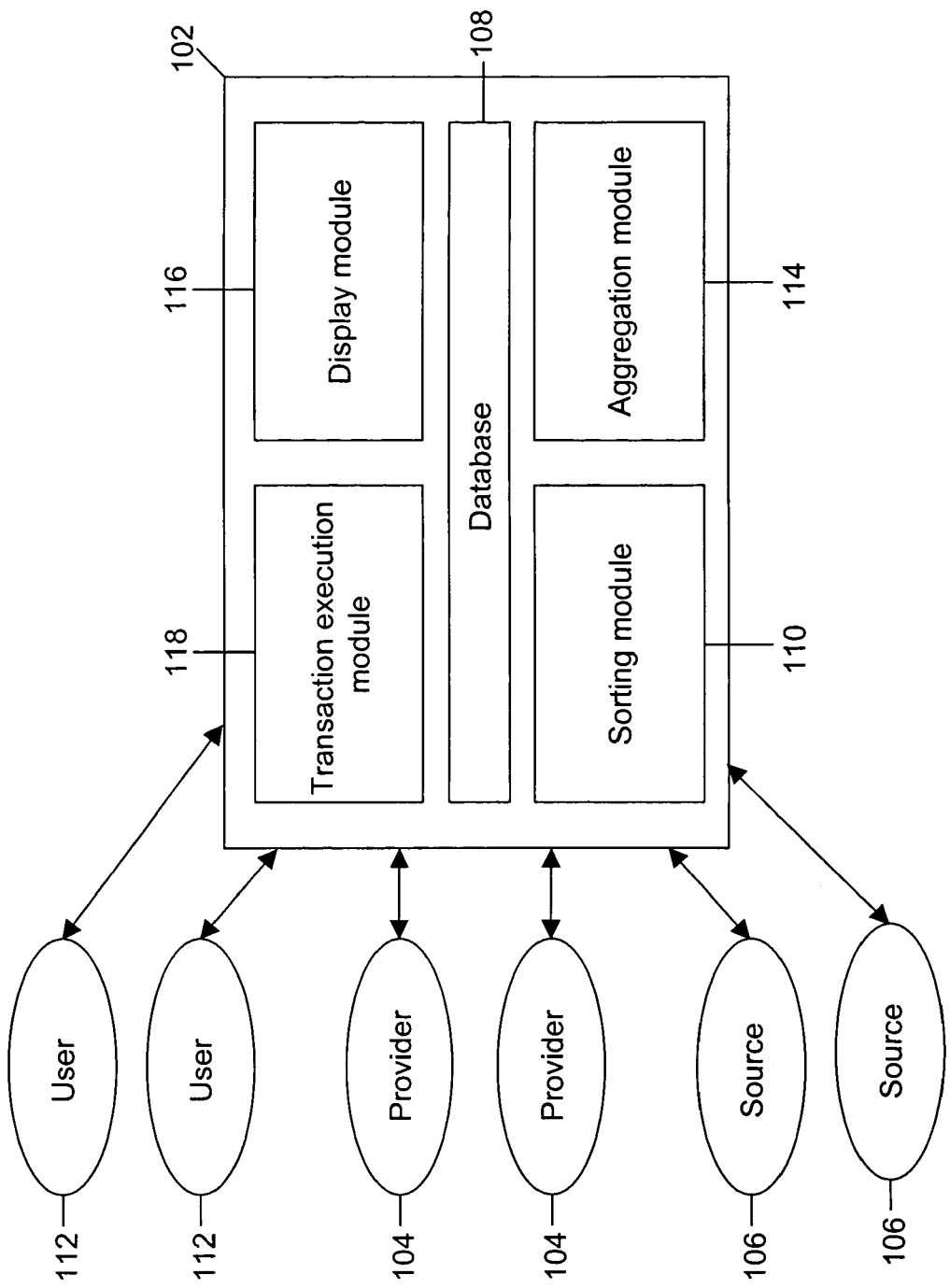
FIG. 1 is a block diagram schematically illustrating a system according to an embodiment of the present invention.

Referring now to FIG. 1, a system 102 according to an embodiment of the present invention is shown. A plurality of providers 104 may be in communication with system 102. Provider 104 may be a buyer or seller of financial instruments. Each provider 104 may provide financial information to enter a financial transaction. This financial information will hereafter be referred as the terms of transaction. Source 106 of the prices maybe a financial institution comprising portals or electronic order matching systems. For example, a source 106 may be Reuters 3000 Matching or EBS Spot. There may also be a plurality of various sources 106 in communication with system 102.

The terms of transaction may depend on the nature of the financial transaction involved. The terms of transaction may comprise the prices at which provider 104 wants to enter a transaction, the volume of financial instrument that provider 104 wants to buy or sell, the source of the prices and other transaction specific details required, or helpful, for executing the transaction. In addition, provider 104 may also provide a quote for obtaining a preference status from system 102. The order in which system 102 displays providers 104 to the users 112 may depend on this preference status. In one embodiment of the present invention, where the transaction is a spot market transaction, the transaction specific details comprise the currency pair for which the transaction may be made.

The provided terms of transaction may be stored in a database 108 of providers 104. A sorting module 110 may sort the terms of transaction stored in database 108. The sorting may be performed using various parameters. For example, the sorting may be performed based on a preference status that may be associated with each provider 104 and an arrival time of the terms of transaction. The arrival time of the terms of transaction may be a time at which the terms of transaction are received by system 102.

The preference status associated with each provider 104 may have two components: a user-defined component and a system-defined component. The system-defined component may be decided based on the quotes provided by providers 104 for the system-defined preference status. A provider 104 having the best quote for the system-defined preference status, may have the highest system-defined preference status. A best quote may be the highest quote from the quotes received for the system-defined preference status. Provider 104 having the next best quote for the system-defined preference status may have the second highest system-defined preference status, and so on.

A user 112 may be a third party, and may select the displayed terms of transaction to initiate the execution of a transaction. The user 112 may specify a user-defined component based on its preference of providers 104. One user 112 may assign a higher user-defined preference status, to a provider 104 the user 112 may prefer. Such a provider 104 will be henceforth referred to as a user-preferred provider. Each user 112 may set or assign a user-preference status for each provider 104, regardless of the user-preference status assigned by another user 112.

The sorted terms of transaction may be communicated from a sorting module 110 to be aggregated in aggregation module 114. The aggregated terms of transaction may be displayed to the users 112 using display module 116. Each user 112 may define the user's 112 preference for displaying the terms of transaction. The aggregated terms of transaction may also be displayed to each user 112 according to the user's 112 display preference.

For example, a user 112 may chose to see all the bid rates and offer rates being provided in the market for a particular currency pair. Another user 112 may, however, decide to hide such details of the market and view only the best prices being provided for all currency pairs. Based at least in part on this displayed information, user 112 may enter into financial transactions.

Each user 112 may select from the displayed terms of transaction, e.g., the terms of transaction according to which the user 112 would like to enter a transaction. Transaction execution module 118 may execute the transaction based at least in part on the selected terms of transaction. Information corresponding to the executed transaction may be used to update a database of providers 108. The updated terms of transaction stored in database of providers 108 may again be sorted by sorting module 110 before displaying the updated terms of transaction to the users 112.

Figure 2:
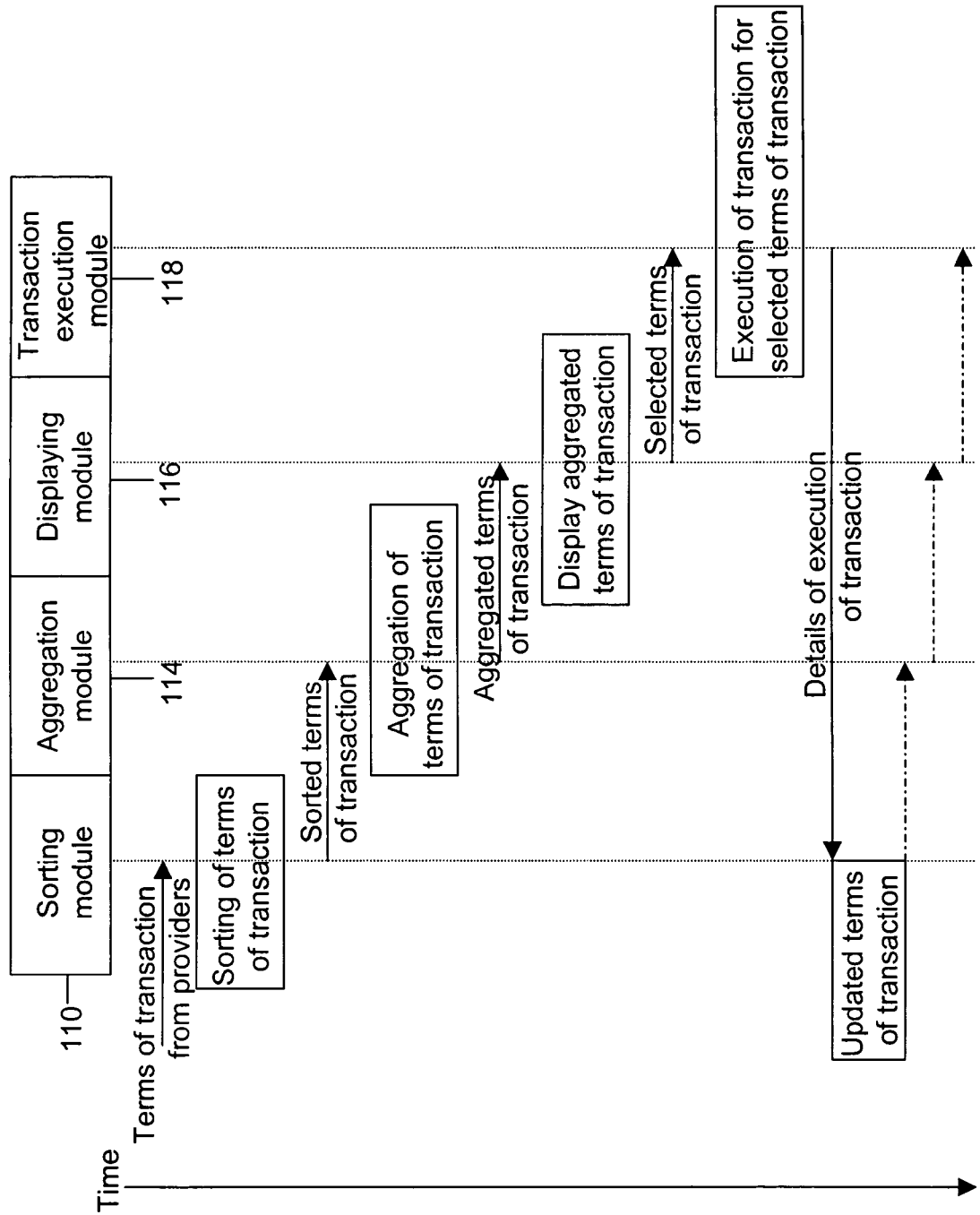
FIG. 2 is a block diagram illustrating an exemplary workflow according to an embodiment of the present invention.

FIG. 2 is a block diagram that schematically illustrates an exemplary workflow according to one embodiment of the present invention. Providers 104 may communicate the terms of a transaction to system 102. The terms of transaction may be sorted by sorting module 110. Sorted terms of transaction may be communicated to aggregation module 114. The terms of transaction may be aggregated by aggregation module 114. The aggregated terms of transaction may be provided to display module 116. The sorted and aggregated terms of transaction may be displayed. A user 112 may select the terms of transaction from displayed terms of transaction. Information corresponding to the selected terms of transaction may be furnished to transaction execution module 118. A transaction based on the selected terms of transaction may be executed by transaction execution module 118. The terms of transaction may be updated based on the details of the executed transaction. The updated terms of transaction may again be sorted by sorting module 110. This described workflow may be repeated to execute further transactions.

The system, as described herein may be embodied in the form of a computer system. Typical examples of a computer system may comprise a general-purpose computer, a programmed microprocessor, a micro-controller, a peripheral integrated circuit element, and other suitable devices or arrangements of devices that generally are capable of implementing the method of the present invention.

An exemplary computer system may comprise a computer, an input device, a display unit, a storage device and a network. A computer may comprise a microprocessor and a memory. A microprocessor may be disposed in communication with a communication bus. Memory may comprise Random Access Memory (RAM) and/or Read Only Memory (ROM). A suitable storage device may comprise a hard disk drive or a removable storage drive such as a floppy disk drive, optical disk drive and the like. A storage device may also be other similar means for loading computer programs, software, or other instructions into a computer system.

A suitable computer system may execute a set of instructions that are stored in one or more storage elements, to process input data. The storage elements may also hold data or other information. The storage element may be in the form of an information source or a physical memory element present in the processing machine.

A set of instructions may comprise various commands that may instruct a processor or processing devise to perform specific tasks, such as for example the method of the present invention. The set of instructions may be in the form of a software program or code. The software may be in various forms such as system software or application software. Further, the software may be in the form of a collection of separate programs, a program module with a larger program or a portion of a program module. The software may also comprise modular programming in the form of object-oriented programming. The processing of input data by the processing machine may be in response to user commands, or in response to results of previous processing or in response to a request made by another processing machine.

Figure 3:
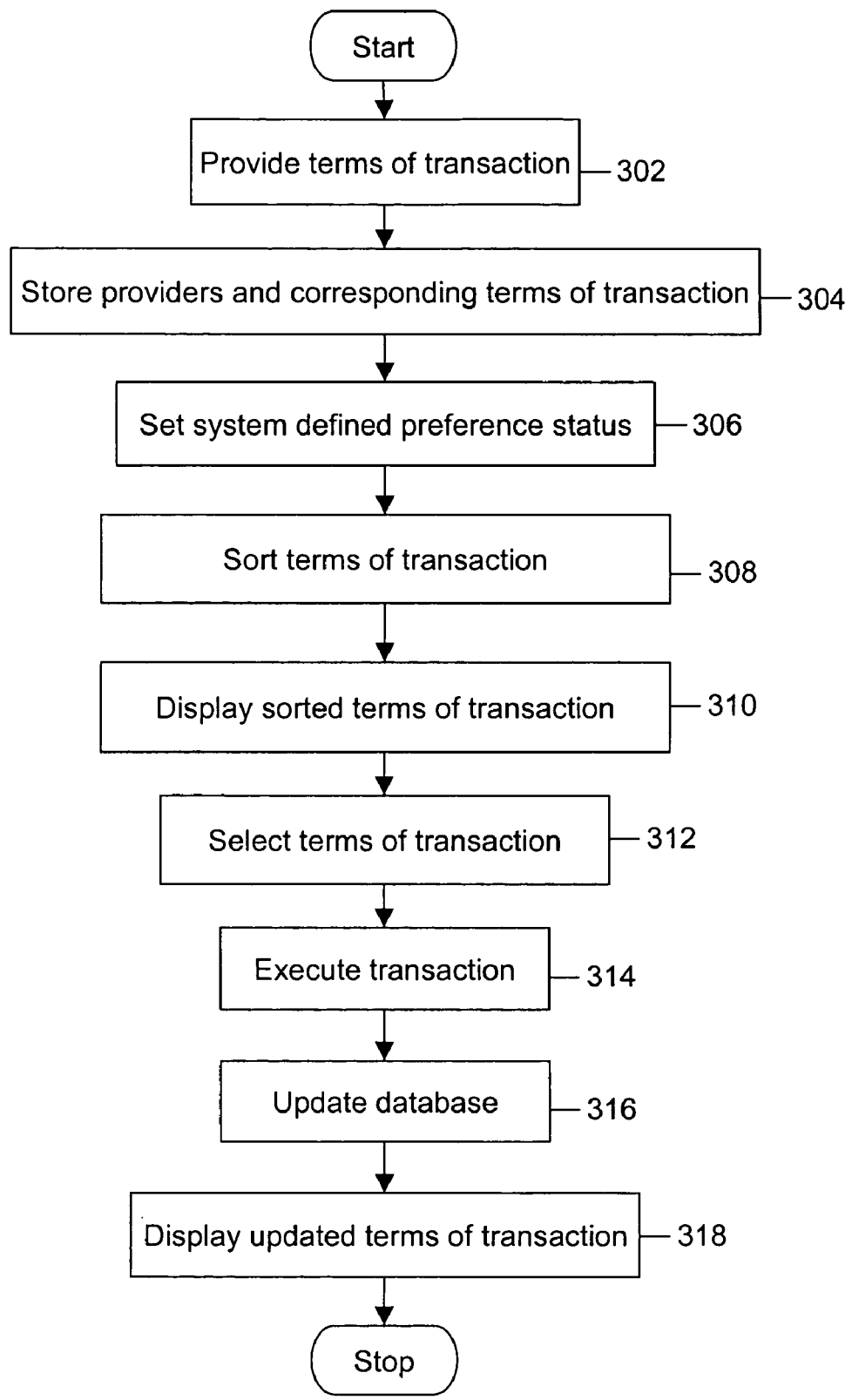
FIG. 3 is a flowchart illustrating a financial transaction.

Referring now to FIG. 3, a flowchart illustrating a method of facilitating the execution of financial transactions according to an embodiment of the present invention is shown. As indicated by block 302, the providers may provide terms of a transaction. These terms of transaction may comprise financial information, such as that mentioned earlier. For example, when the transaction is a spot market transaction, a provider may provide terms of transaction comprising EUR/USD as the currency pair that the provider may wish to deal in. The provider may further provide the EUR/USD bid rate as 84 and Euro 5 million as the volume corresponding to the particular terms of transaction. The provider 104 may also provide other transaction-specific details for the transaction. Such terms of transaction may be streamed in from other providers. Each time a provider changes or cancels any terms of transaction, the terms of transaction may be updated accordingly. Therefore, the terms of transaction that are available may be real-time terms of transaction. As indicated by block 304, the terms of transaction may be stored in a database of providers, such as for example database 108. The terms of a transaction corresponding to one transaction provided by a provider may be grouped together.

As indicated by block 306, a system-defined component of a preference status may be set based on quotes provided by the providers for obtaining the system-defined preference status. As indicated by block 308, the received grouped terms of transaction may be sorted further based at least in part on the prices comprised within the grouped terms of transaction.

As indicated by block 310, the sorted terms of transaction may be displayed to the users. In one embodiment, the terms of transaction may be displayed to a user based on the user's preferences, as described above. Each set of grouped terms of transaction may be displayed together as one unit. As indicated by block 312, a user may select a unit from the displayed units, according to which the user may wish to enter a transaction.

As indicated by block 314, the corresponding transaction may be executed based at least in part on the selected terms of transaction. In the cited example, the transaction may be executed on the terms of transaction corresponding to the Euro 1 million offer made by provider 'A'. As indicated by block 316, a database of providers storing the terms of transaction may be updated based at least in part on the executed transaction. Finally, as indicated by block 318, the updated terms of transaction may be displayed to the users for further transactions.

Figure 4:
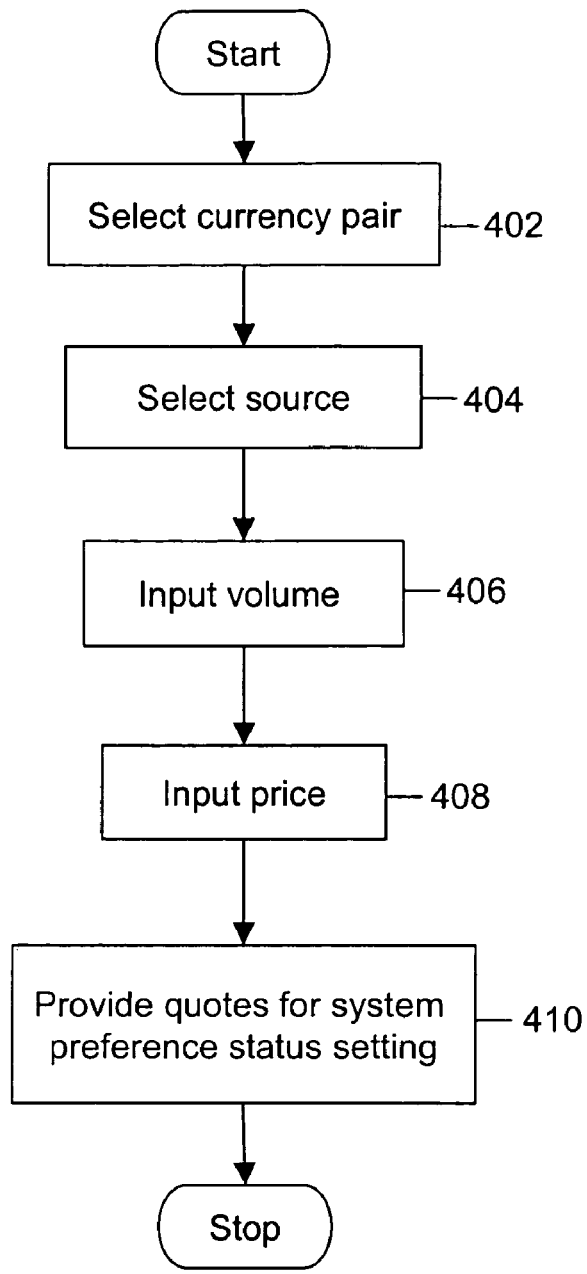
FIG. 4 is a flowchart illustrating terms of a transaction.

FIG. 4 is a flowchart illustrating a method of providing the terms of transaction according to one embodiment of the present invention. The transaction may be a spot market transaction. As indicated by block 402, a provider may select a currency pair in which the provider wishes to deal. As indicated by block 404, the provider may select a source. As described above, a source may comprise a financial institution.

As indicated by block 406, the provider may input a volume of financial instrument to be transacted. This volume will hereafter be referred as the available transaction volume. If the provider wishes to buy some volume of financial instrument as well as sell some, the provider can enter these volumes of financial instrument, and specify which volume of financial instrument is being bid for purchase and which is being offered for sale.

As indicated by block 408, the provider may input a price at which the provider wishes to transact. The provider may input a bid rate corresponding to the volume of financial instrument being bid for purchase and an offer rate corresponding to the volume of financial instrument being offered for sale. The provider may also provide other transaction-specific details required for executing the transaction. As indicated by block 410, the provider may input a quote for obtaining the system-defined preference status. As described in the preceding description, these provided terms of transaction may be sorted based at least in part on the provided prices.

Figure 5:
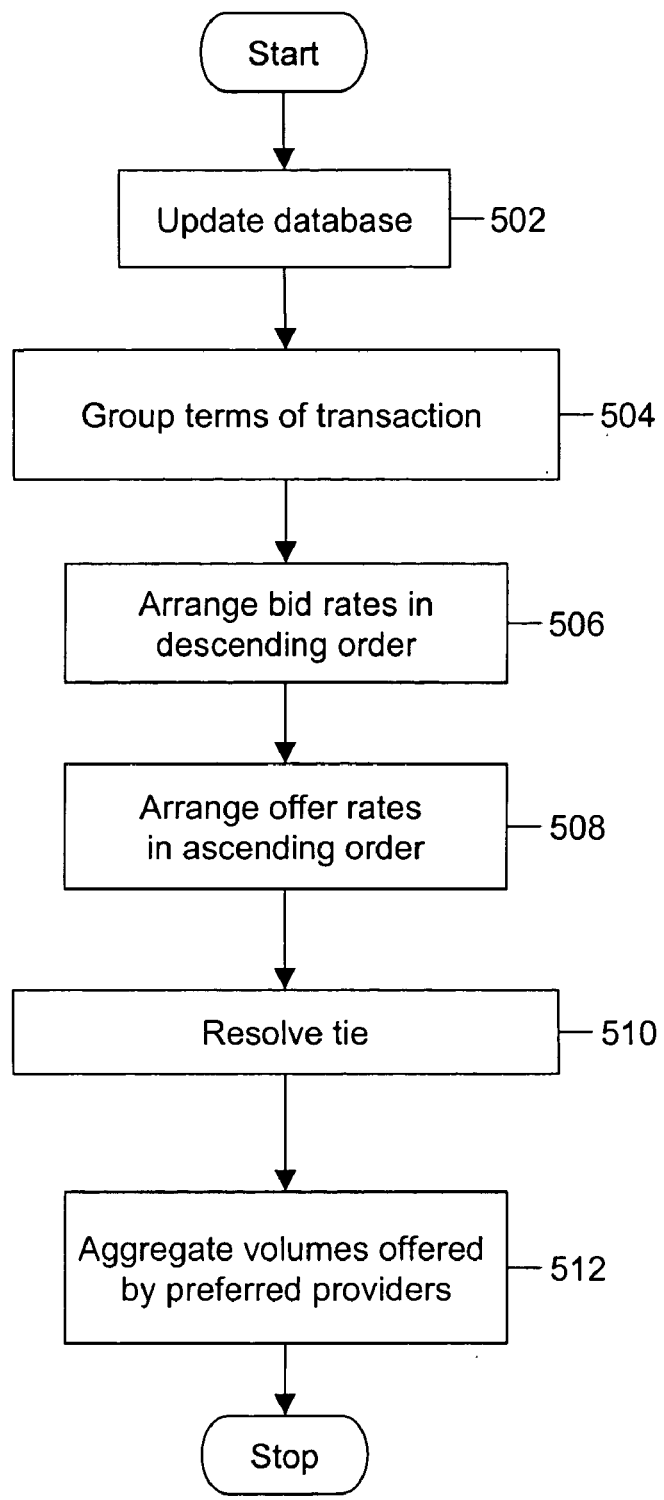
FIG. 5 is a flowchart illustrating a method of sorting the terms of transaction.

FIG. 5 is a flowchart illustrating a method of sorting terms of a transaction according to an embodiment of the present invention. As indicated by block 502, a database of providers may be updated according to received terms of transaction. As indicated by block 504, the terms of transaction in the updated database of providers may be collected according to the currency pair selected. All the terms of transaction with a particular currency pair may be collected together. For example, terms of transaction comprising the EUR/USD currency pair may be collected together and all the terms of transaction comprising an AUD/USD currency pair will be collected together. The terms of transaction may be arranged according to the corresponding provided prices. The prices provided within the terms of transaction may be bid rates or offer rates. As indicated by block 506, the provided bid rates and hence, the corresponding terms of transaction may be listed in a descending order. Therefore, the highest bid may be placed at the top of the bid rate list.

As indicated by block 508, provided offer rates, and hence, the corresponding terms of transaction may be listed in an ascending order. Two lists of provided terms of transaction may be prepared for each currency pair within a database of providers. One list may be for the bids and the other list may be for the offers. The lists may include the best prices at the top followed by the next best prices, and so on. Cases may arise when two more providers have provided the same bid or offer rates. Such a case is called a tie, and the involved providers are called tied providers. As indicated by block 510, ties may be resolved. As indicated by block 512, the volumes provided by the preferred providers within each list may be aggregated. Resolving ties and aggregating the volumes offered by preferred providers will be explained in detail in the following paragraphs with reference to FIG. 6.

Figure 6:
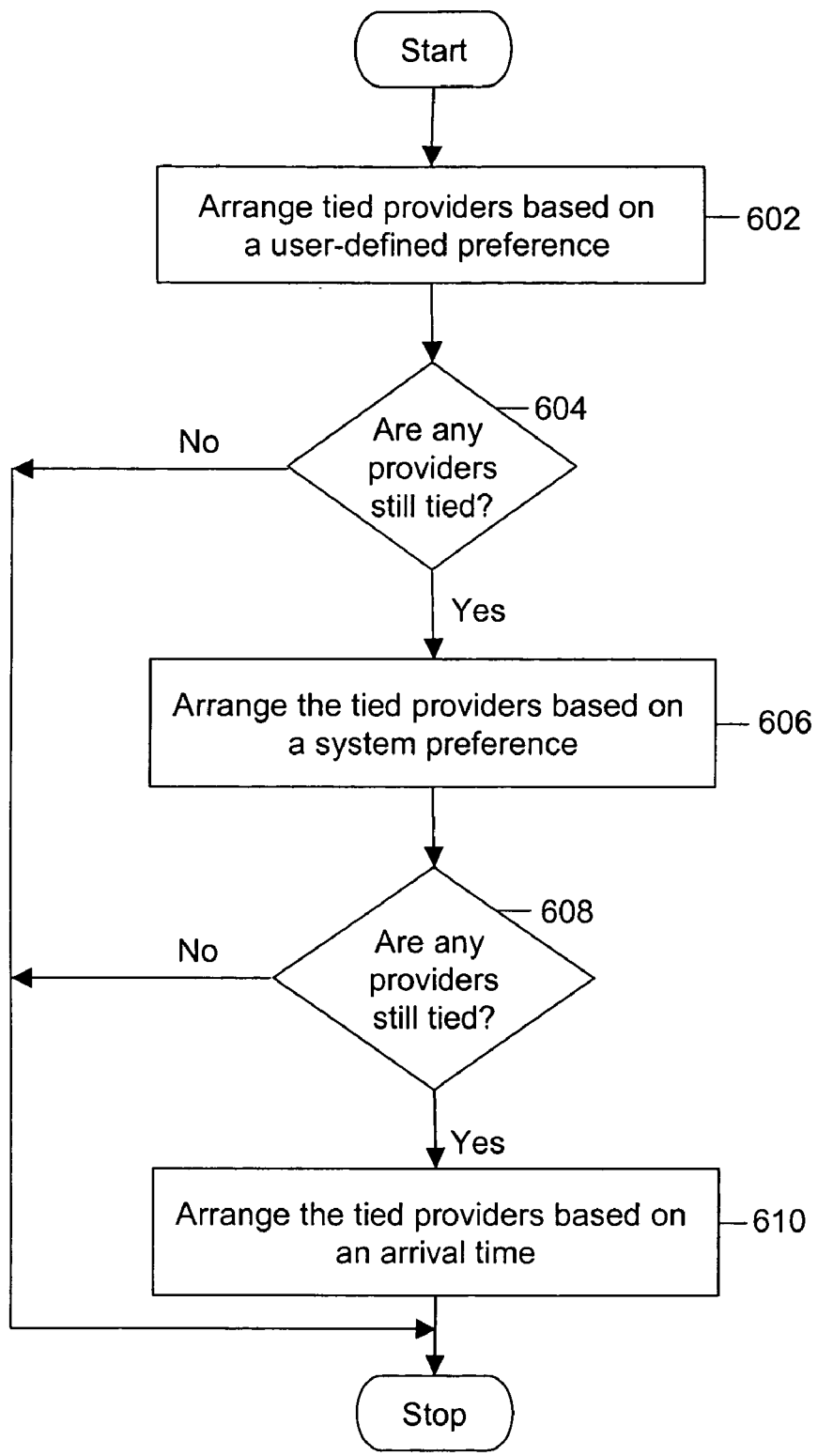
FIG. 6 is a flowchart illustrating a method of resolving a tie between providers.

FIG. 6 is a flowchart illustrating a method of resolving a tie between tied providers. As indicated by block 602, in case of a tie, the tied providers may be arranged in a descending order of the user-defined preference status. For example, consider a list containing providers 'A', 'B', 'C', 'D' and 'E', to be sorted for a user 'Y'. If provider 'E' provides the lowest bid rate, provider 'E' will be placed at the bottom of the list. Further, if providers 'A', 'B', 'C' and 'D' provide the same bid rates, then their user-defined preference status may resolve a tie. In the present example, if user 'Y' has assigned providers 'A', 'B' and 'C' a higher user-defined preference status, then these three providers may be placed above provider 'D'. As indicated by block 604, it may be determined if a tie still exists between the providers. A tie may exist if there are two or more providers who are providing the same price and have the same user-defined preference status. Here, providers 'A', 'B' and 'C' are still tied.

As indicated by block 606, the tied providers may be arranged according to their system-defined preference status, if such a tie still exists. These tied providers may be placed in descending order of their system-defined preference status. The provider with the highest system-defined preference status may be placed at the top and the provider with the lowest system-defined preference status may be placed at the bottom. For example, assume that, provider 'A' is providing the highest quote followed by providers 'B' and 'C' providing equal quotes for obtaining the system-defined preference status. Therefore, provider 'A' will be placed above providers 'B' and 'C'.

As indicated by block 608, another check may be made for the existence of any ties. A tie may still exist if the providers tied at block 604 have the same system-defined preference status. In the present example, providers 'B' and 'C' are still tied. As indicated by block 610, the tie may be resolved based at least in part on arrival time of the prices. The arrival time of a price may be the time at which the price was received by the system, such as system 102, from the corresponding provider. The prices with earlier arrival times may be placed higher in the list. In the present example, if the price provided by provider 'B' reached the system 102 before the price provided by provider 'C', provider 'B' will be placed above provider 'C'. Consequently, the list will have provider 'A' at the top followed by providers 'B', 'C', 'D' and 'E', in that order. If the arrival time of the providers tied at step 610 is the same, then the prices will be placed at the same position in the list. The arrangement of the terms of transaction may be based on a variety of other suitable factors.

Figure 7:
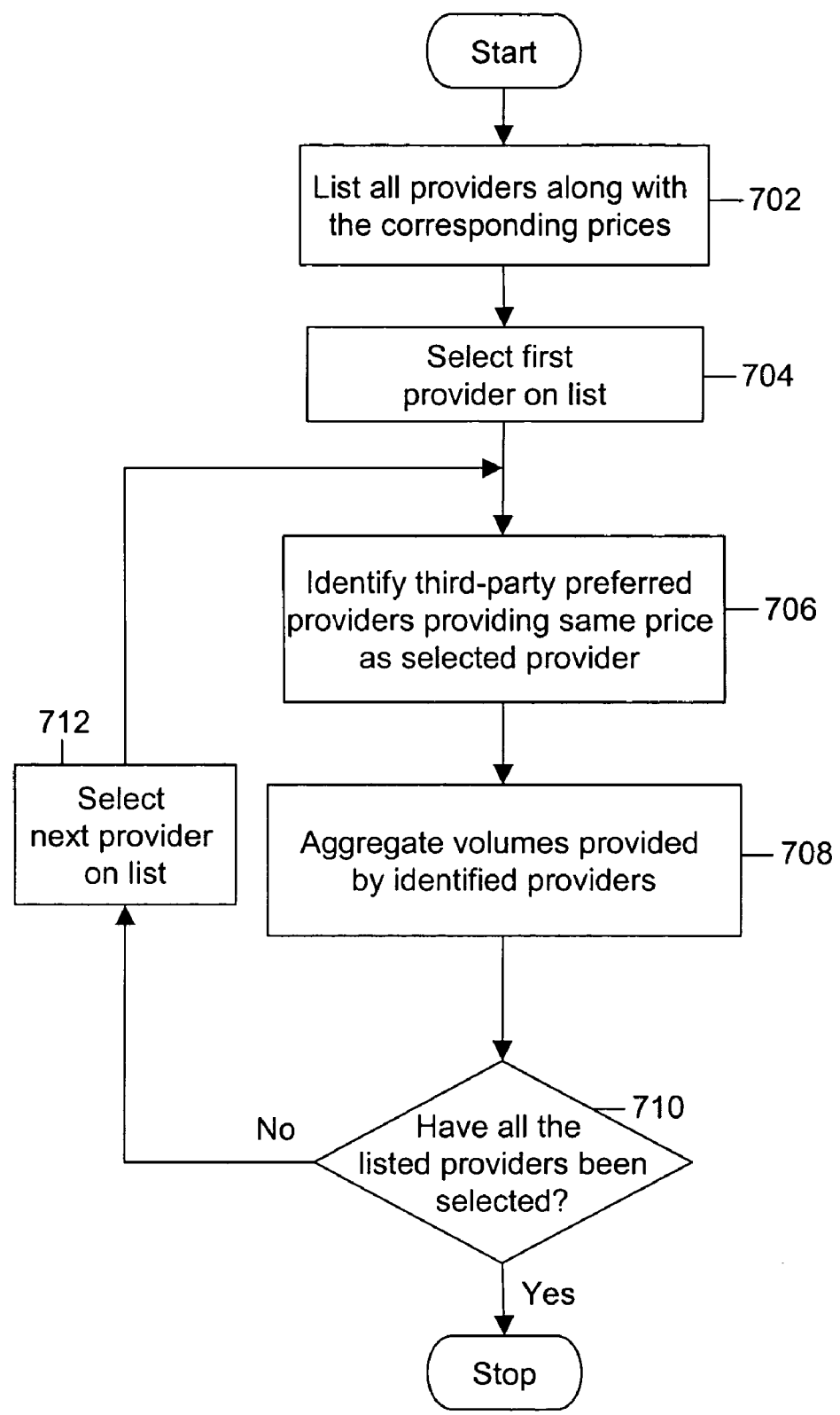
FIG. 7 is a flowchart illustrating a method of aggregating available transaction volumes.

FIG. 7 is a flowchart illustrating a method of aggregating the volumes provided by the user-preferred providers. As indicated by block 702, a sorted provider list with corresponding terms of transaction may be prepared after all the providers are sorted according to the method shown in FIG. 6. As indicated by block 704, the first provider on the list may be selected. Continuing with the example above, provider 'A' may be selected. As indicated by block 706, all user-preferred providers providing the same price as that provided by the selected provider may be identified. For example, user-preferred providers 'A', 'B' and 'C', who provide the same price as provider 'A', may be identified. As indicated by block 708, the available transaction volumes provided by these identified providers may be aggregated. For example, the available transaction volumes provided by providers 'A', 'B' and 'C' may be aggregated. This aggregated volume may be linked to corresponding terms of transaction provided by the selected provider. The volume obtained by aggregating the available transaction volumes provided by providers 'A', 'B' and 'C' may be linked with the terms of transaction provided by provider 'A'.

As indicated by block 710, it may be determined if all the providers in the list have been selected. As indicated by block 712, the next provider on the list may be selected if all the providers have not been selected. The method from block 706 to step 712 may be repeated until all the providers have been selected. Providers 'B', 'C', 'D' and 'E' may be considered one by one and the steps described above may be repeated. In this example, the aggregated volumes linked with terms of transaction corresponding to providers 'A', 'B', C and 'D' may be the same.

In another embodiment of the present invention, the aggregation of provided volumes may be performed for the providers based at least in part on their system-defined preference status.

After the sorted lists are prepared along with the linked aggregated volumes, they may be displayed to users according to the users' preferences. Users may decide to enter a transaction, based at least in part on the displayed information.

Figure 8:
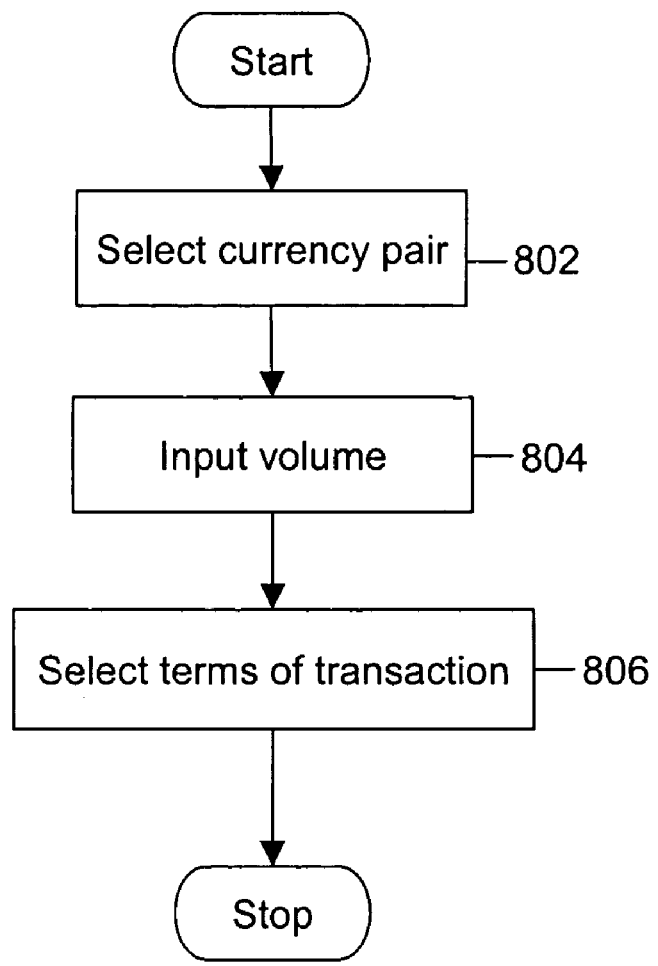
FIG. 8 is a flowchart illustrating a method of initiating a transaction.

FIG. 8 is a flowchart illustrating a method of initiating a transaction according to an embodiment of the present invention. In one embodiment, the transaction may be a spot market transaction. As indicated by block 802, user interested in making a transaction may select a currency pair that the user wishes to deal in. For example, if one desires to buy Euros using US dollars, one may select EUR/USD. As indicated by block 804, the user may input the volume of financial instrument desired to be bought or sold. This volume of financial instrument will hereafter be referred as transaction volume. As indicated by block 806, the user may select from the displayed list the terms of transaction. This selection may be made with a click of a mouse or a keystroke of a keyboard.

The selection may comprise the selection of the price at which a user wishes to enter a transaction. This price may be referred to as the selected price. The volume corresponding to this price, comprised within the selected terms of transaction, may be referred to as the selected volume. For example, if user 'Z' selects the terms of transaction corresponding to provider 'A' offering Euro 1 million for sale, at an offer rate of 87, then 87 is the selected price and Euro 1 million is the selected volume.

Figure 9:
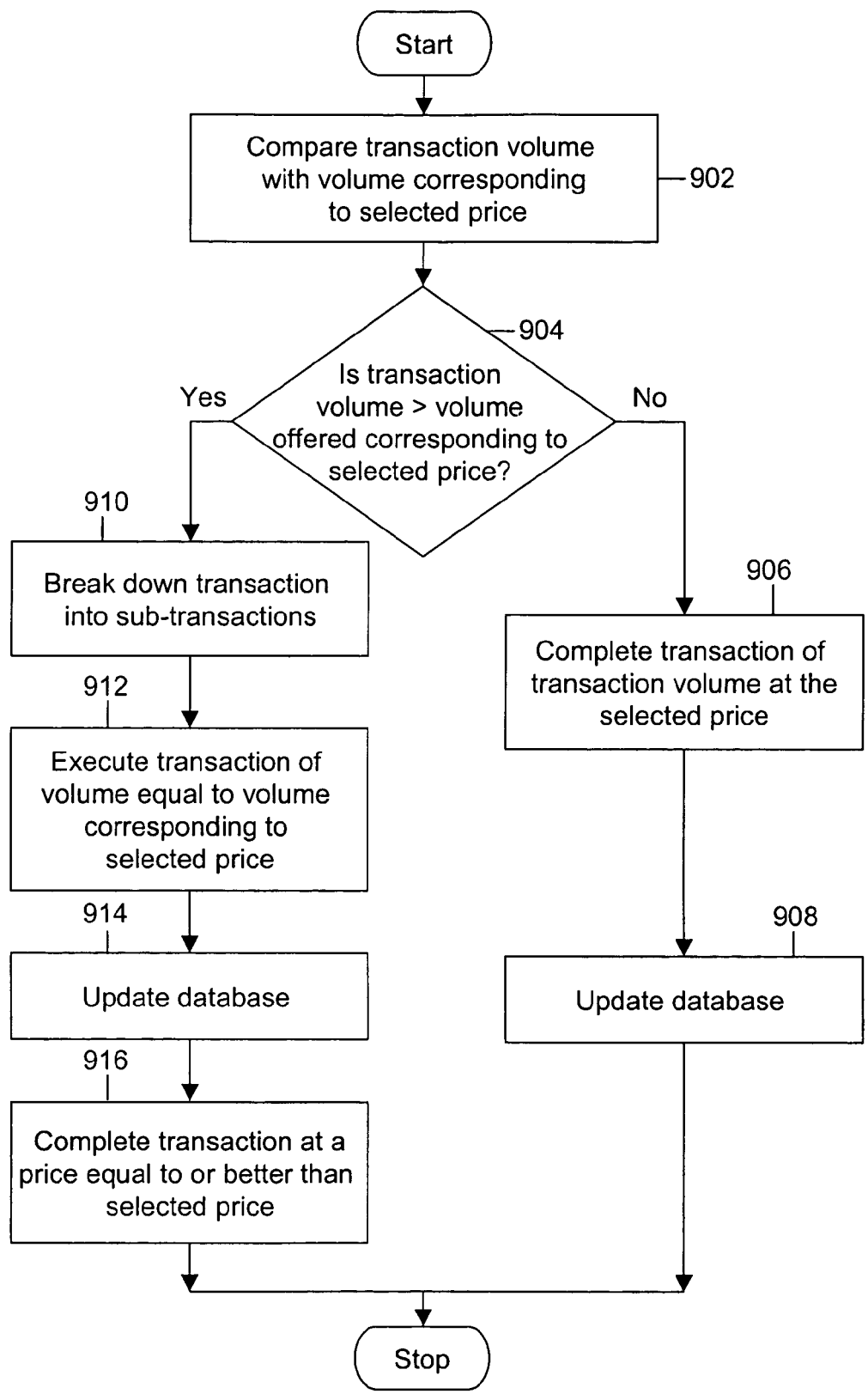
FIG. 9 is a flowchart illustrating a method of executing a financial transaction.

FIG. 9 is a flowchart illustrating a method of executing a financial transaction as selected by the user. As indicated by block 902, the transaction volume to be transacted as input by the user may be compared with the selected volume. As indicated by block 904, if the transaction volume is not greater than the selected volume, then step 906 may be performed. As indicated by block 906, the transaction for the transaction volume may be completed at the selected terms of transaction, such as the selected price. The transaction may be completed through the selected provider at the selected price. Steps involved in the transaction are explained in detail below, and with reference to FIG. 11 and FIG. 12. As indicated by block 908, the database of providers may be updated.

As indicated by block 904, if the transaction volume is greater than the selected volume, step 910 may be performed. As indicated by block 910, the transaction may be broken down into two or more sub-transactions. As indicated by block 912, a transaction of a volume equal to the selected volume may be executed according to the selected terms of transaction. As indicated by block 914, a database of providers may be updated according to the executed transaction. As indicated by block 916, the transaction may be completed at a price better than or equal to the selected price. In case the user wants to sell a financial instrument, a better price generally is a bid rate higher than the selected bid rate and in the case that the user wants to buy a financial instrument, a better price generally is a lower offer rate than the selected one. Completing a transaction is described in detail in the following paragraphs.

Figure 10A:
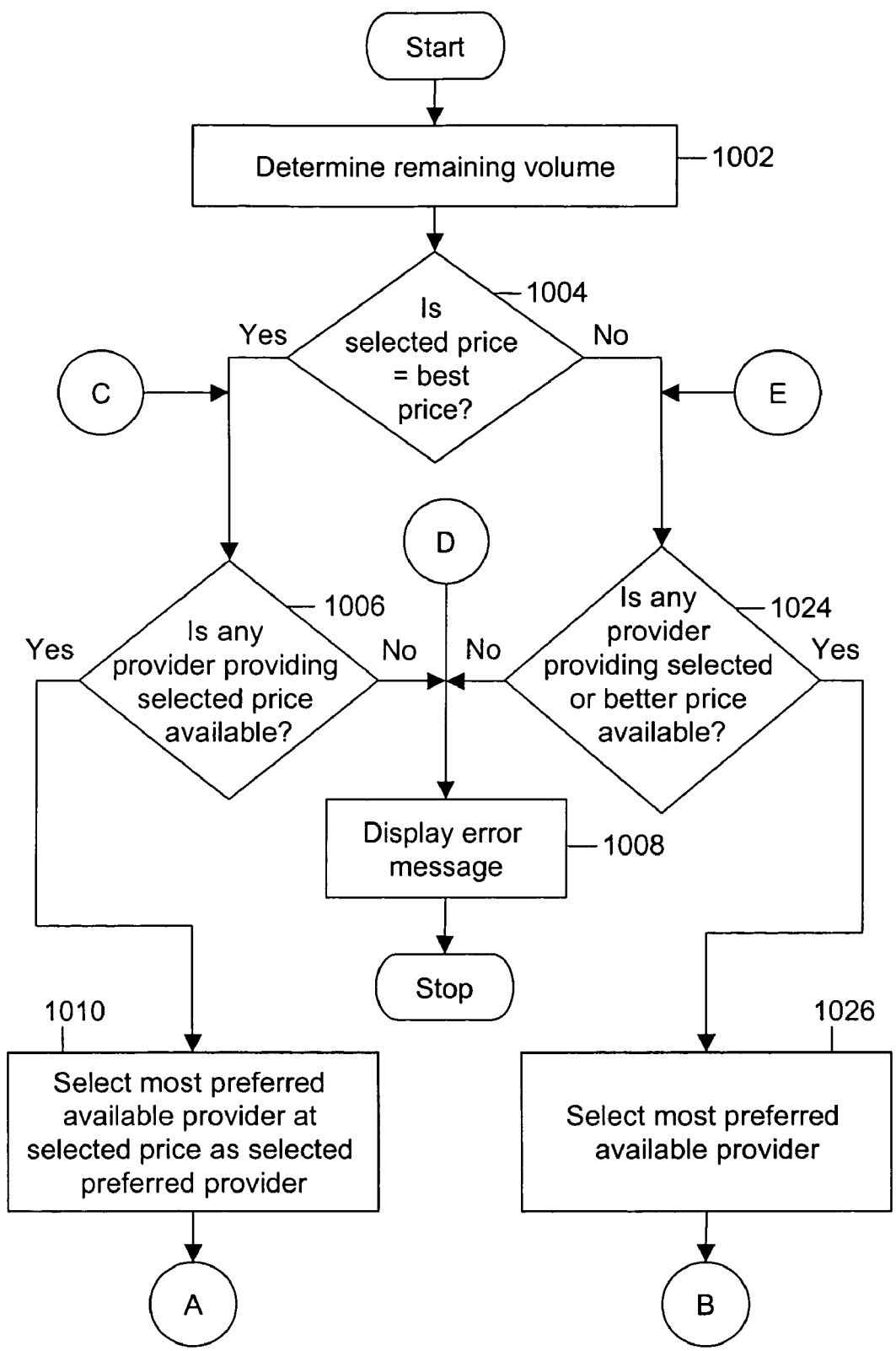
FIG. 10 is a flowchart illustrating completing a sub-transaction.
Figure 10B:
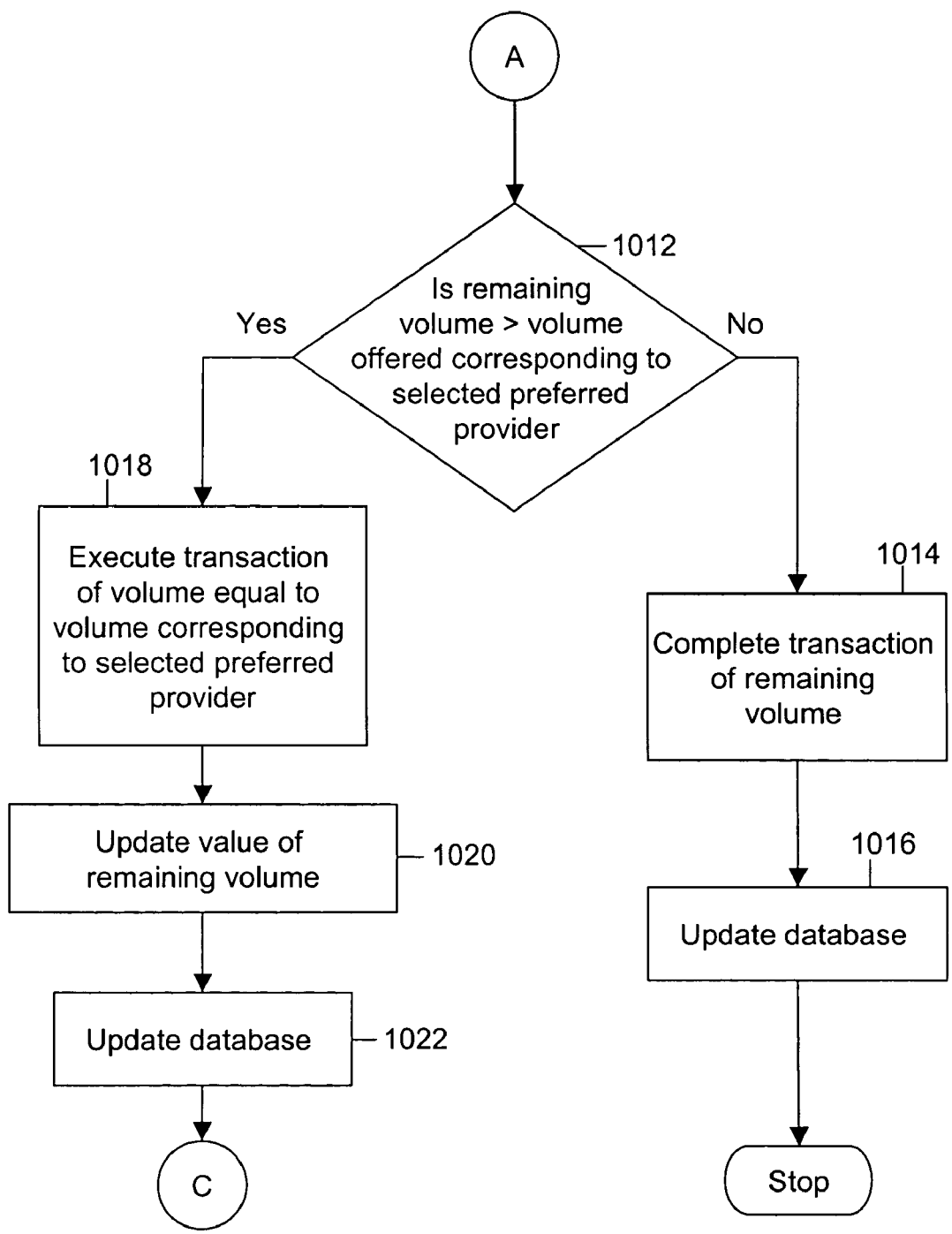
Figure 10C:
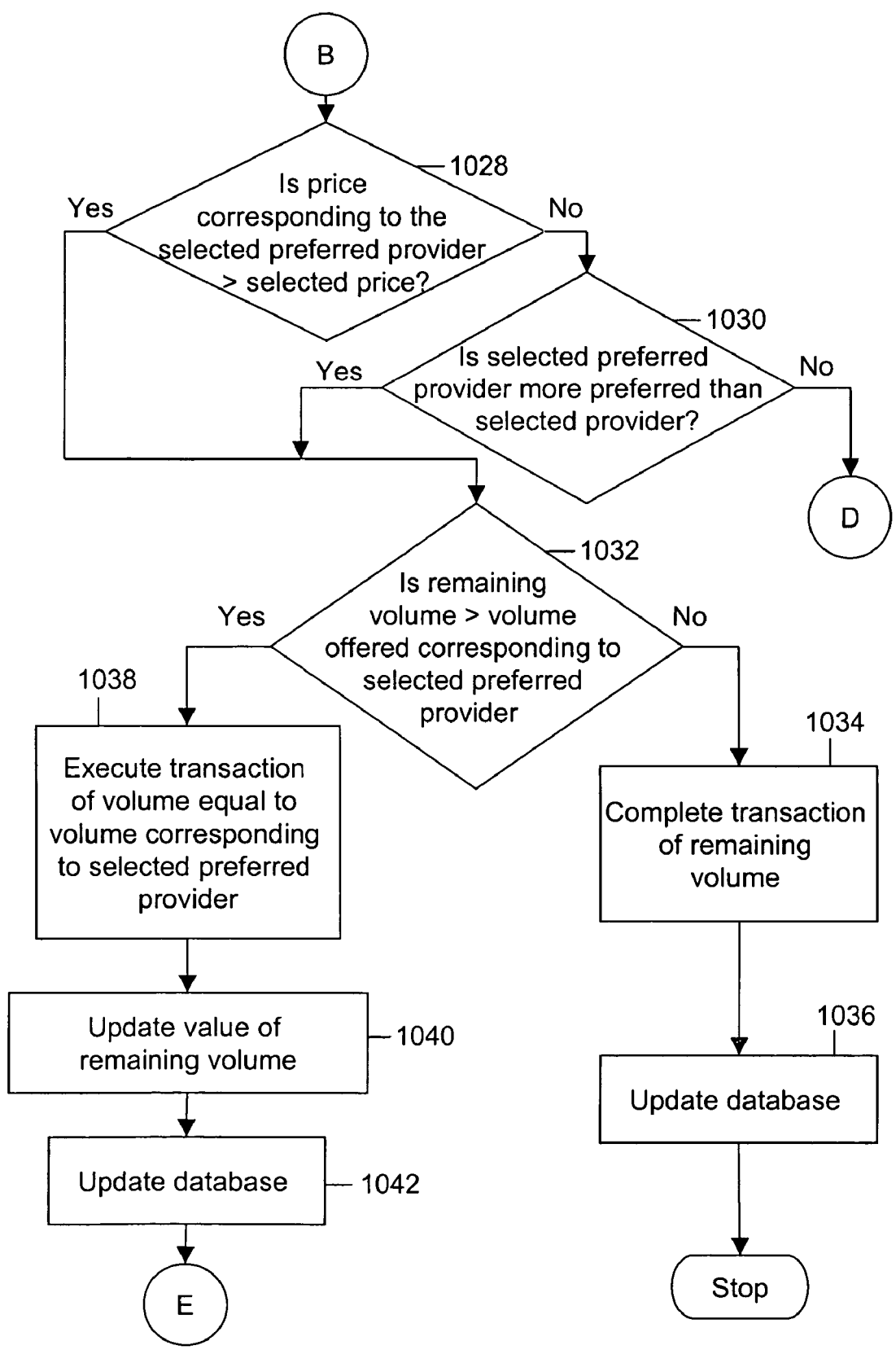

FIGS. 10A-10C are flowcharts illustrating a method of completing a transaction. As indicated by block 1002, the remaining volume may be calculated. The remaining volume may be the transaction volume decreased, or reduced, by the volume for which the transaction has been executed. In one embodiment, the remaining volume may be a difference between the transaction volume and the selected volume. As indicated by block 1004, it may be determined whether the selected price is equal to the best price. If the selected price is equal to the best price, step 1006 may be performed. As indicated by block 1006, it may be determined whether there are any available providers providing the selected price. A provider may be considered available if the provider has a non-zero available transaction volume. Such a provider with unexecuted provided volume may be referred to as an available provider.

If no available provider is providing the same price as the selected price, then an error message may be displayed to the user, as indicated by block 1008. This message may alert the user that the execution for a volume equal to the remaining volume could not be executed. If, however, there is an available provider, step 1010 may be performed. As indicated by block 1010, the most preferred available provider may be selected. The most preferred available provider may be an available provider placed highest in the list among all the available providers. Such a provider may be the available provider with the highest preference status, and may be referred to as the selected preferred provider.

Referring now to FIG. 10B, block 1012 indicates that if the remaining volume is not greater than the volume corresponding to the selected preferred provider, step 1014 may be performed. As indicated by block 1014, the transaction for the remaining volume may be completed based at least in part on the terms of transaction corresponding to the selected preferred provider. Following this, block 1016 indicates that a database of providers may be updated based at least in part on the executed transaction.

If, at step 1012, the remaining volume is greater than the volume corresponding to the selected preferred provider, step 1018 may be performed. As indicated by block 1018, a transaction for a volume corresponding to the selected preferred provider may be executed. As indicated by block 1020, the value of the remaining volume may be updated. Correspondingly, at step 1022, the database of providers may be updated based at least in part on the executed transaction. To facilitate further transactions, the steps from step 1006 to step 1020 may be repeated.

Referring again to FIG. 1A, if it is determined at step 1004 that the selected price is not equal to the best price, step 1024 may be performed. As indicated by block 1024, it is determined whether there is any available provider providing a price equal to or better than the selected price. If the user want to sell, a better price may be a higher bid rate. If the user wants to buy, a better price may be a lower offer rate. As indicated by block 1008, an error message may be displayed to the user if there is no such available provider. In case such an available provider exists, then, as indicated by block 1026, an available provider placed highest among the available providers may be selected.

As indicated by block 1028, in FIG. 1C, it may be determined whether the price corresponding to the selected preferred provider is greater than the selected price. If the price corresponding to the selected preferred provider is not greater than the selected price, step 1030 may be performed. As indicated by block 1030 it may be determined whether the selected preferred provider is preferred to the selected provider. The selected preferred provider may be preferred to the selected provider if the selected preferred provider is placed higher on the list than the selected provider. If the selected preferred provider is not placed higher than the selected provider, an error message may be displayed, as indicated by block 1008.

If, as indicated by block 1028, the price corresponding to the selected preferred provider is greater than the selected price, or if as indicated by block 1030, the selected preferred provider is placed higher than the selected provider, step 1032 may be performed. As indicated by block 1032, it may be determined whether the remaining volume is greater than the available transaction volume corresponding to the selected preferred provider. If the remaining volume is less then or equal to the available transaction volume corresponding to the selected preferred provider, step 1034 may be performed. As indicated by block 1034, the transaction may be completed for the remaining volume. This transaction maybe executed according to the terms of transaction corresponding to the selected preferred provider. As indicated by block 1036 a database of providers may be updated, to reflect the executed transaction.

As indicated by block 1032, if the remaining volume is greater than the available transaction volume corresponding to the selected preferred provider, step 1038 may be performed. As indicated by block 1038, a transaction may be executed for the available transaction volume corresponding to the selected preferred provider. As indicated by block 1040, the value of the remaining volume may be updated. As indicated by block 1042, the database of providers may be updated based at least in past on the executed transaction. Steps 1024 to 1042 may be repeated until the execution of the selected transaction is completed.

The steps involved in the execution of a transaction are explained in the following paragraphs. The execution of a transaction may start with the generation of a request by a transaction execution module. The request may be sent to the source corresponding to the transaction. On receiving the request, the source may execute the transaction. The volume for which the request is made may be the entire transaction volume or a sub-transaction volume. A sub-transaction volume may be a volume corresponding to a sub-transaction. The generated request may be communicated to the source of the price corresponding to the request. This price may be referred to as the requested price. The request may be handled according to the source of the requested price.

If the source of the price is an electronic order matching system, then in accordance with an embodiment of the invention, the request sent may be a limit order such as, a limit order of Immediate or Cancel (IOC) type or a limit order of "good till canceled" type. The "good till canceled" type of limit order may remain valid until it is manually withdrawn from the system. An order submission event may be logged in a database of providers and a limit IOC order may be sent to the electronic order matching system. The steps taken at the electronic order matching system are further described below and with reference to FIG. 11.

Figure 11A:
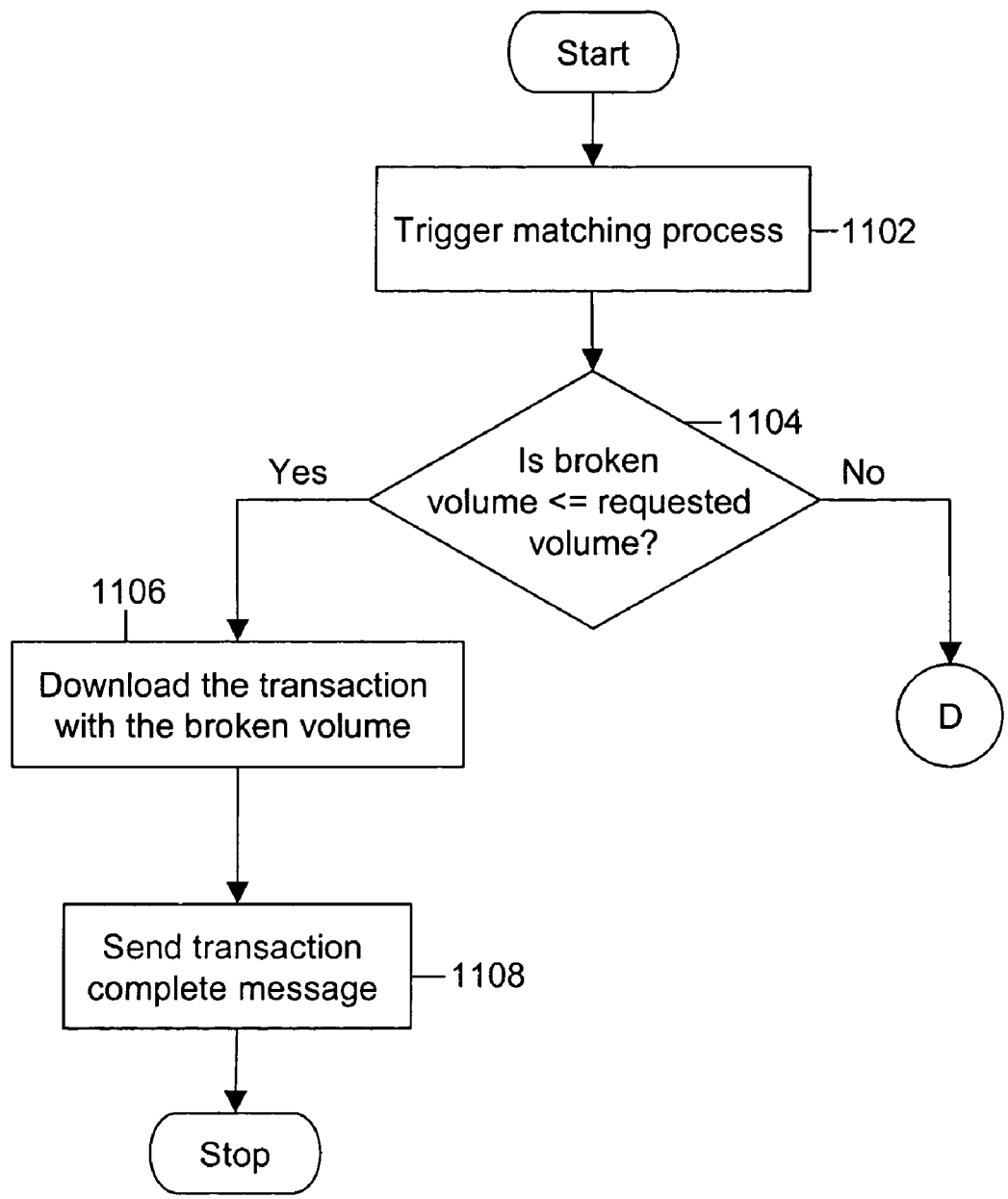
FIG. 11 is a flowchart illustrating handling a request for a price from an order matching system.

Referring now to FIG. 11, a flowchart is shown illustrating a method of handling a request when the source of the requested price is an electronic order matching system (OMS). As indicated by block 1102, a matching process may be triggered in the OMS. As indicated by block 1104, it may be determined whether the sub-transaction volume is less than or equal to the volume available corresponding to requested price. The volume available corresponding to a requested price may be referred to as the requested volume. The requested volume may not be equal to the sub-transaction volume. For example, the provider, who is providing the requested volume, may withdraw all or part of the volume. If the sub-transaction volume is less than or equal to the requested volume, step 1106 may be performed. As indicated by block 1106, the details for transaction corresponding to the request may be communicated, e.g., downloaded, to the provider's download queue or to the download queue of a provider's bank. The provider's bank may be a bank the provider uses for performing the transactions. A download queue may be a queue saved on a database at the provider's bank or the provider's bank's back-end system. As indicated by block 1108, a transaction complete message may be communicated to the user, which may be logged in a database of providers.

Figure 11B:
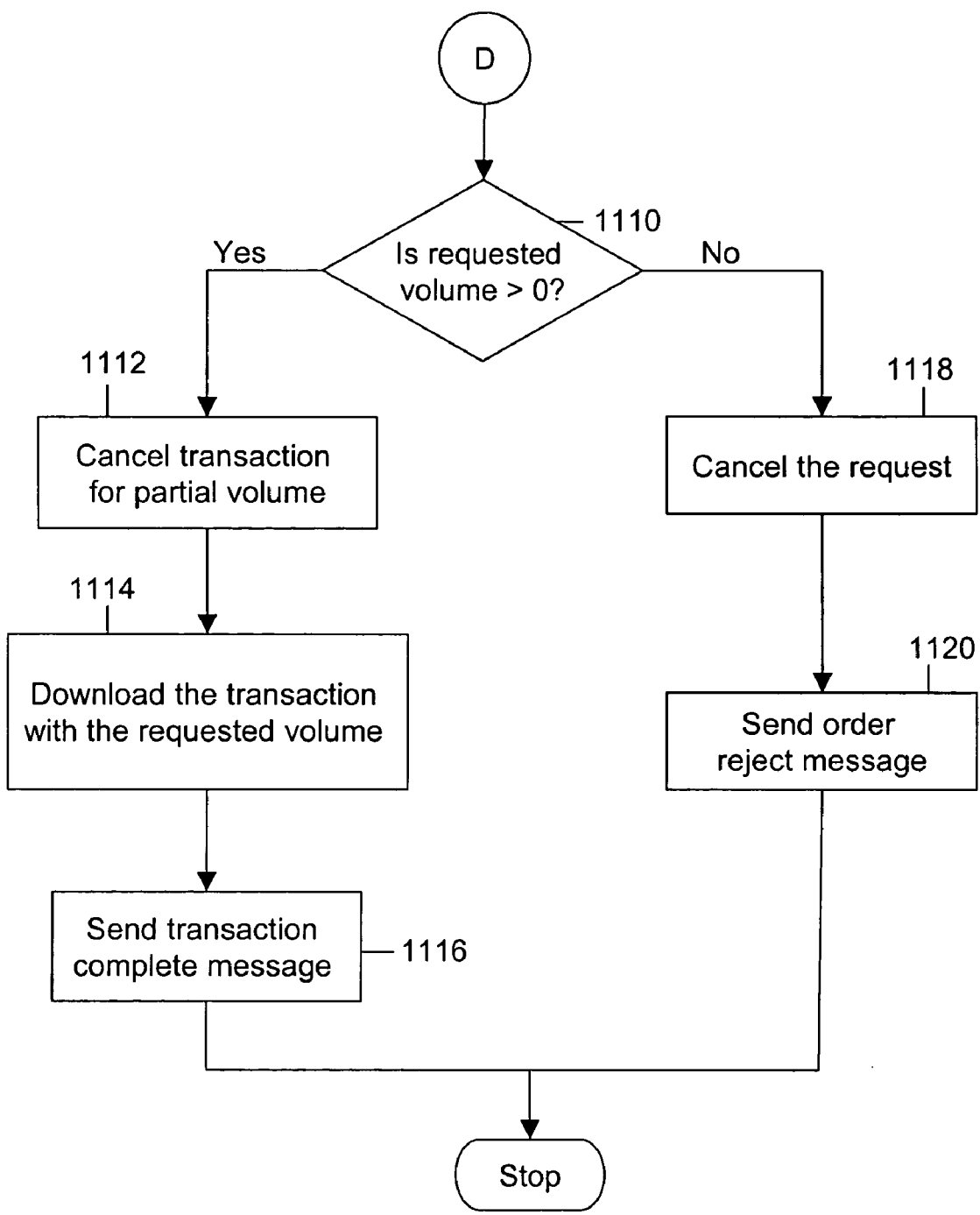

If, as indicated by block 1104, the sub-transaction volume is greater than the requested volume, step 1110 may be performed. Referring now to FIG. 11B, block 1110 indicates that it may be determined whether the requested volume is greater than zero. If the requested volume is greater than zero, step 1112 may be performed. As indicated by block 1112, the transaction for the sub-transaction volume decreased by the requested volume may be canceled. As indicated by block 1114, the details for the transaction corresponding to the requested volume may be communicated to the provider's download queue. As indicated by block 1116, a transaction complete message may be sent to the user, and a transaction complete event may be logged in database of providers. This message may correspond to the partial transaction, which may be for the volume equal to the requested volume. If, at step 1110, it is determined that the requested volume is not greater than zero, step 1118 may be performed. As indicated by block 1118, the request may be cancelled. As indicated by block 1120, an order reject message may be communicated to the user, and an order reject event may be logged in a database of providers.

If the price is an executable streaming price (ESP) from a bank or other institution, then a price acceptance message may sent to the user and a price acceptance event may be logged in database of providers. The steps executed in such a case will be described in detail below and with reference to FIG. 12.

Figure 12:
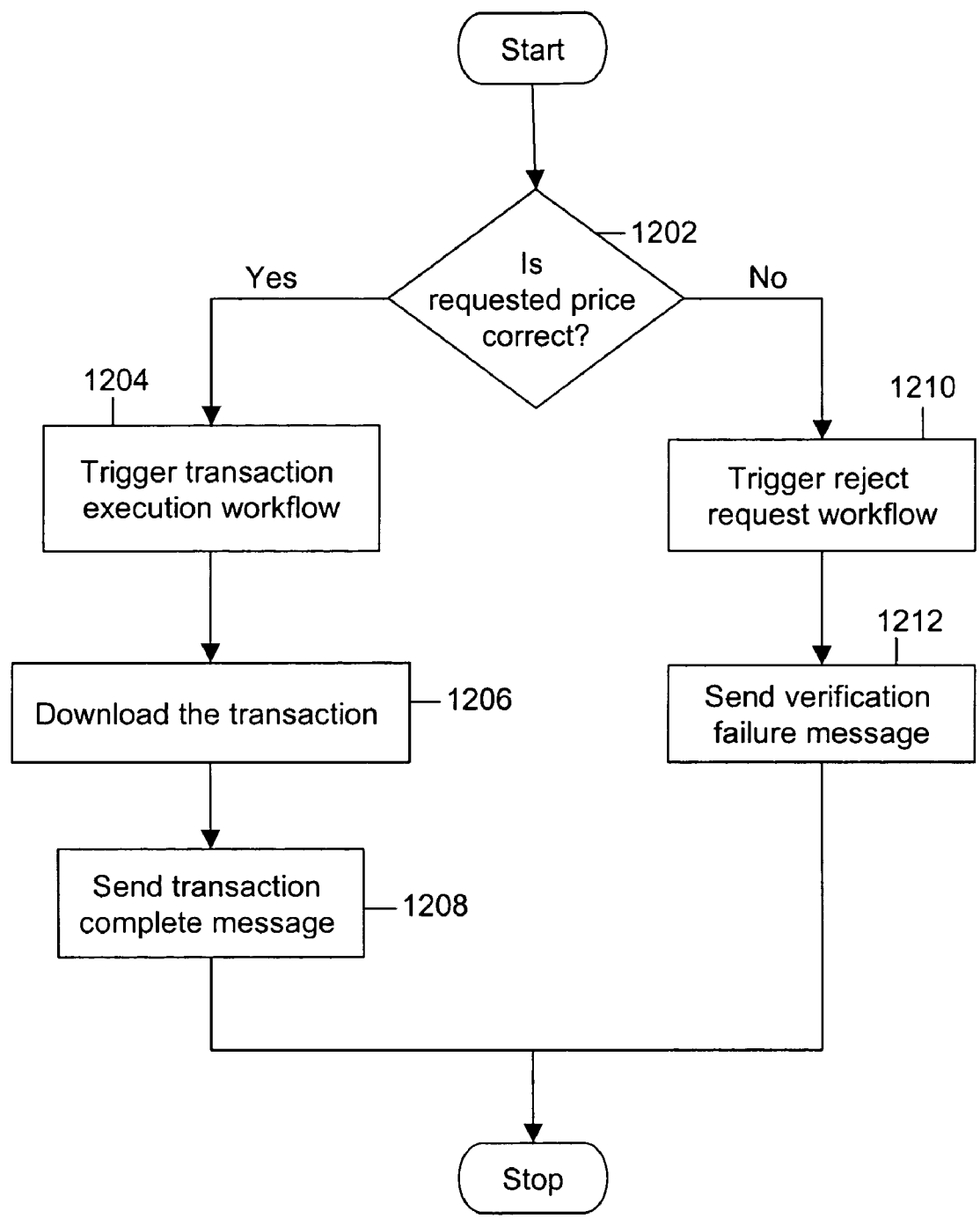
FIG. 12 is a flowchart illustrating handling a request for a price.

FIG. 12 is a flowchart illustrating a method of handling a request for a price, which may be an executable streaming price. As indicated by block 1202, the bank's application program interface (API) may verify the requested price. If the verification is successful, step 1204 may be performed. As indicated by block 1204, the trade execution workflow may be triggered. The transaction may be communicated to the bank's trade download queue.

As indicated by block 1208, a transaction complete message may be sent and the transaction completion event may be logged in a database of providers. However, if at step 1222 the verification fails, step 1212 may be performed. At step 1212, the request reject workflow may be triggered. At step 1214, a verification failure message may be sent to the user, and the corresponding event may be logged in a database of providers. The execution of any transaction may lead to a change in the terms of transaction. This may be accounted for as the database of providers may be updated after every transaction.

Figure 13:
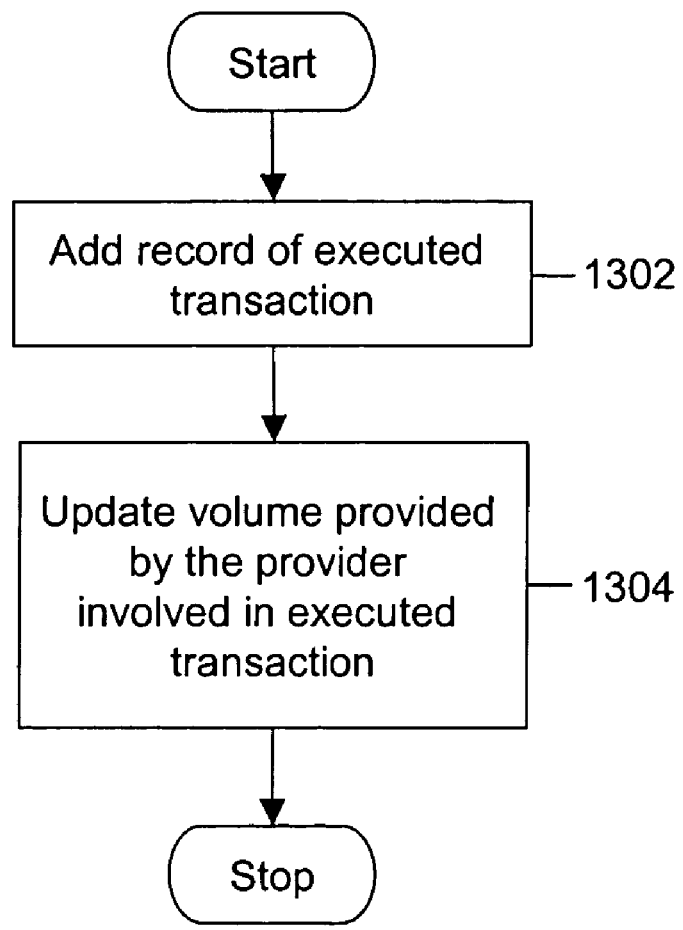
FIG. 13 is a flowchart illustrating a method of updating a database of providers.

FIG. 13 is a flowchart illustrating a method of updating a database of providers after execution of a transaction. As indicated by block 1302, a record of the executed transaction may be added to a database of providers. As indicated by block 1304, the volume provided by a provider involved in the transaction may be updated. The updated volume may project the difference between the volume provided by the provider and the volume corresponding to the executed transaction.

Figure 14:
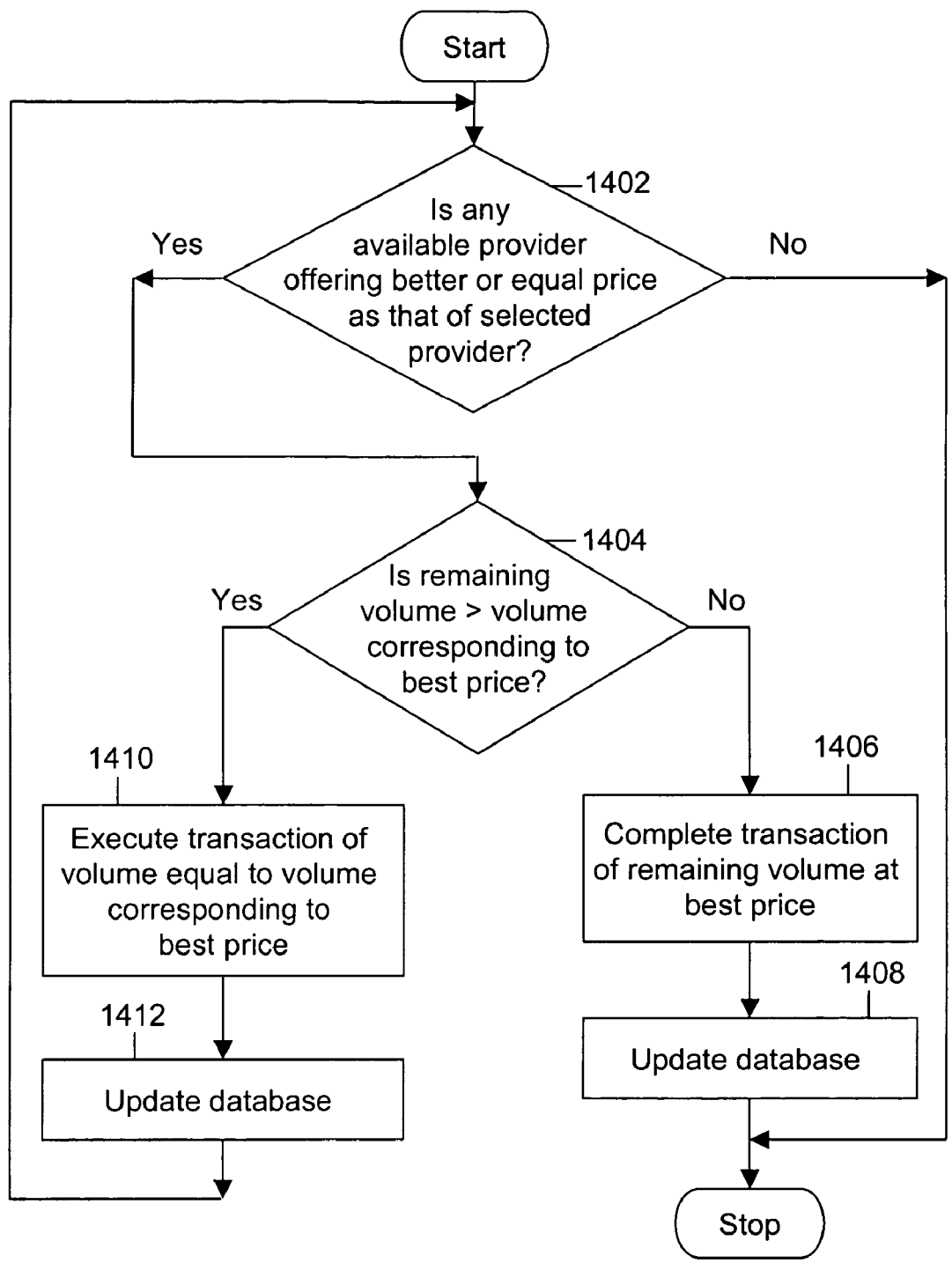
FIG. 14 is a flowchart illustrating a method of executing a financial transaction.

Referring now to FIG. 14, an alternate embodiment of a method of executing a financial transaction is shown. As indicated by block 1402, whether there are any available providers providing a price better than or equal to the selected price may be determined. If the user wants to sell financial instruments, a better price may be a bid rate higher than the selected bid rate. If the user wants to buy financial instruments, a better price may be an offer rate lower than the selected offer rate. If there is any such available provider, step 1404 may be performed.

As indicated by block 1404, whether the remaining volume is greater than the volume corresponding to the best price may be determined. The remaining volume may be the transaction volume reduced by the volume for which a transaction has been executed. Therefore, the remaining volume may be equal to the transaction volume. The best price may be a price provided by an available provider, who may be placed highest in the list of providers. This available provider may be the selected provider, or some other provider in the database of providers. In case the available provider is some other provider, the available provider may be placed higher than the selected provider while being displayed to the user. The best price may be either a price better than the selected price or a price equal to the selected price. Where the best price is equal to the selected price, then it may be provided by a provider, which may be the selected provider or a provider that is placed higher than the selected provider in the list.

If, as indicated by block 1404, the remaining volume is less than or equal to the volume corresponding to the best price, step 1406 may be performed. As indicated by block 1406, a transaction may be executed for the volume corresponding to the remaining volume. As indicated by block 1408, a database of providers may be updated based at least in part on the executed transaction. However, if at step 1404 the remaining volume is greater than the volume corresponding to the best price, step 1410 may be performed.

As indicated by block 1410, a transaction may be executed for a volume corresponding to the best price. The transactions according to steps 1406 and 1410 may be executed based at least in part on the terms of transaction corresponding to the best price. Further, as indicated by block 1412, a database of providers may updated based at least in part on the executed transaction. Steps from step 1402 to 1412 may be repeated until there is no available provider. If there is no available provider, an error message may be communicated to the user alerting it that a transaction for the remaining volume could not be executed.

In another embodiment of the present invention, the details provided by a provider for setting the system-defined preference status associated with it may be provided independent of the terms of transaction. A provider's system-defined preference status may be set universally and may be linked to all the terms of transaction provided by the provider. The basis for sorting may also include additional parameters provided in the terms of transaction. For example, a volume provided by a provider may be considered when resolving a tie and when deciding the order of the providers in the list. The currency pair may be set as a default currency pair. Hence, a user may not be required to select a currency pair while selecting a transaction.

The foregoing description of the exemplary embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. A computer-implemented method comprising:
   receiving a user-defined preference status for each of a plurality of providers on a computer, the user-defined preference status based on a relative preference of a user for each of the plurality of providers;
   receiving prices from the plurality of providers each of the received prices on the computer comprising a bid rate or an offer rate and further comprising an available volume of a financial instrument associated with each of the received prices;
   generating a first list on the computer of the plurality of providers sorted in ascending order based on the received prices associated with the bid rates;
   identifying from the generated first list a tie on the computer between a first provider associated with a first bid rate and a first user-defined preference status and a second provider associated with a second bid rate and a second user-defined preference status, wherein the first bid rate and the second bid rate are equal, and the first user-defined preference status is greater than the second user-defined preference status;
   sorting the first list on the computer such that the first provider appears before the second provider.
   generating a second list on the computer of the plurality of providers sorted in ascending order based on the received prices associated with the offer rates;
   identifying from the generated second list a tie on the computer between a third provider associated with a first offer rate and a third user-defined preference status and a fourth provider associated with a second offer rate and a fourth user-defined preference status, wherein the first offer rate and the second offer rate are equal, and the third user-defined preference status is greater than the fourth user-defined preference status;
   sorting the second list on the computer such that the third provider appears before the fourth provider;
   causing the first list and the second list to be displayed on a display in communication with the computer.

2. The computer-implemented method according to claim 1, further comprising:
   receiving a selection of a selected provider from the first list or the second list;
   identifying a plurality of user-preferred providers providing a price equal to that provided by the selected provider; and
   aggregating the available volume of the financial instrument provided for sale or required for purchase by the plurality of user-preferred providers.

* * * * *

UNITED STATES PATENT AND TRADEMARK OFFICE
CERTIFICATE OF CORRECTION

PATENT NO. : 7,882,011 B2  Page 1 of 1
APPLICATION NO. : 10/911076
DATED : February 1, 2011
INVENTOR(S) : Harpal S. Sandhu et al.

It is certified that error appears in the above-identified patent and that said Letters Patent is hereby corrected as shown below:

Column 10, line 41, Please delete "1A", and insert -- 10A --.

Column 10, line 53, Please delete "1C", and insert -- 10C --.

Column 11, line 42, Please delete "(1OC)", please insert -- (IOC) --.

Column 11, line 46, Please delete "1OC", please insert -- IOC --.

Column 12, line 30, After "may", please insert -- be --.

Signed and Sealed this
Twenty-first Day of June, 2011

David J. Kappos
*Director of the United States Patent and Trademark Office*